(12) United States Patent
de Silva et al.

(10) Patent No.: US 9,548,922 B2
(45) Date of Patent: Jan. 17, 2017

(54) ENABLING SCALABLE VIRTUAL MACHINE TRACKING IN A DATA CENTER FABRIC

(71) Applicant: CISCO TECHNOLOGY, INC., San Jose, CA (US)

(72) Inventors: Suran Saminda de Silva, Saratoga, CA (US); Shyam Kapadia, Santa Clara, CA (US); Rajesh Babu Nataraja, Sunnyvale, CA (US); Nilesh Shah, Fremont, CA (US); Pei-chun Cheng, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 546 days.

(21) Appl. No.: 14/074,522

(22) Filed: Nov. 7, 2013

(65) Prior Publication Data

US 2015/0124814 A1    May 7, 2015

(51) Int. Cl.
| | |
|---|---|
| *H04L 12/741* | (2013.01) |
| *H04L 12/931* | (2013.01) |
| *G06F 9/44* | (2006.01) |
| *H04L 12/713* | (2013.01) |

(52) U.S. Cl.
CPC ............. *H04L 45/745* (2013.01); *G06F 9/44* (2013.01); *H04L 49/70* (2013.01); *H04L 45/586* (2013.01)

(58) Field of Classification Search
CPC ....... H04L 45/586; H04L 45/745; H04L 49/70
USPC ........................................................ 370/392
See application file for complete search history.

(56) References Cited

U.S. PATENT DOCUMENTS

| | | | | |
|---|---|---|---|---|
| 2006/0233168 | A1* | 10/2006 | Lewites | H04L 12/462 370/389 |
| 2008/0043765 | A1* | 2/2008 | Belgaied | H04L 12/4679 370/409 |
| 2011/0093849 | A1* | 4/2011 | Chawla | H04L 41/0816 718/1 |
| 2012/0063363 | A1* | 3/2012 | Li | H04L 12/4645 370/255 |
| 2012/0185846 | A1 | 7/2012 | Recio | |
| 2013/0262390 | A1 | 10/2013 | Kumarasamy et al. | |
| 2013/0262638 | A1 | 10/2013 | Kumarasamy et al. | |
| 2013/0262801 | A1 | 10/2013 | Sancheti | |
| 2013/0275568 | A1* | 10/2013 | Nguyen | H04L 41/5025 709/223 |

(Continued)

OTHER PUBLICATIONS

IEEE, "902.1Qbg—Edge Virtual Bridging,," last modified May 14, 2013, retrieved and printed Nov. 5, 2013, 7 pages.

(Continued)

*Primary Examiner* — Stephen J Clawson
(74) *Attorney, Agent, or Firm* — Patent Capital Group (57) ABSTRACT

A method is provided in one example embodiment and includes receiving at a first network element a packet from a second network element; processing the packet at the first network element to obtain information regarding an identity of a virtual machine ("VM") hosted by the second network element contained within the packet; and storing at the first network element the identifying information. The identifying information stored at the first network element is accessible by at least one third network element. In some embodiments, the first network element comprises a physical switch and the second network element comprises a virtual switch.

17 Claims, 4 Drawing Sheets

(56) References Cited

U.S. PATENT DOCUMENTS

| | | | | |
|---|---|---|---|---|
| 2013/0311991 A1* | 11/2013 | Li | ........................ | H04L 61/103 |
| | | | | 718/1 |
| 2014/0007089 A1* | 1/2014 | Bosch | ................... | G06F 9/4856 |
| | | | | 718/1 |
| 2014/0115576 A1* | 4/2014 | Kothari | ............... | G06F 9/45558 |
| | | | | 718/1 |

OTHER PUBLICATIONS

Tumuluri, et al., VSI Discovery and Configuration Protocol (VDP),Version 01, Proposed Resolutions to subset of comments against 802.1 Qbg Draft-1, Jul. 12, 2010, 21 pages.

* cited by examiner

| SUB-TYPE (1 OCTET = 0xF1) | VSIID FORMAT (1 OCTET) | VSIID (16 OCTETS) | VMID FORMAT (1 OCTET) | VMID (16 OCTETS) | VM NAME (N OCTETS) |
|---|---|---|---|---|---|
| 52 | 54 | 56 | 58 | 60 | 62 |

FIG. 5

| Host Name | Segment | Vlan | Mac-address | IP-Address | Interface |
|---|---|---|---|---|---|
| VM14 | 6100 | 100 | 0050.56BB.11D5 | 192.168.1.113 | Eth2/4 |
| VM13 | 6100 | 100 | 0050.56BB.11D0 | 192.168.1.114 | Eth2/4 |

FIG. 6

ENABLING SCALABLE VIRTUAL MACHINE TRACKING IN A DATA CENTER FABRIC

TECHNICAL FIELD

This disclosure relates in general to the field of computer networking and, more particularly, to techniques for enabling scalable tracking of virtual machines ("VMs") in a data center fabric.

BACKGROUND

Currently, for virtualized data centers, visibility of orchestration engines, such as vCloud Director, Openstack, and Cloupedia, to name a few, is limited to the hypervisors and virtual switch managers. Such orchestration engines provision virtual machines ("VMs") and their resources, both on the hypervisor and on the virtual switches. All of these VMs talk to the other VMs or to the infrastructure outside the data center via the data center network fabric. The network fabric comprises a collection of Top of Rack ("ToR") switches, referred to as leaf switches, that in turn are connected by a set of spine stitches. The orchestration engines do not have visibility into the fabric; similarly, the switches in the fabric have no visibility into the server and their hypervisor infrastructure. Hence, the switches cannot relay to the network or server administrators information regarding where a particular VM is physically attached to the network.

A crude way of tracking this information would be to dump the Address Resolution Protocol ("ARP") and Media Access Control ("MAC") tables and then attempt to correlate the information to form a table of directly attached local hosts. This is not only unwieldy but would make it very difficult for the administrators to correlate the information across various databases; moreover, the information would be provided on a per-interface or per-virtual Network Interface Card ("vNIC") basis, rather than a per end host/VM basis.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving at a first network element a packet from a second network element; processing the packet at the first network element to obtain information regarding an identity of a virtual machine ("VM") hosted by the second network element contained within the packet; and storing at the first network element the identifying information. The identifying information stored at the first network element is accessible by at least one third network element. In some embodiments, the first network element comprises a physical switch and the second network element comprises a virtual switch. The packet may be created by the second network element in response to a Virtual Station Interface Discovery and Configuration Protocol ("VDP") event. In some embodiments, the at least one third network element comprises a physical switch. The first network element may include a leaf switch and the at least one third network element may include a spine switch connected to the leaf switch. The packet may include a Type-Length-Value ("TLV") element comprising the identifying information. In certain embodiments, the identifying information may include a name of the VM in association with an identity of at least one network interface to which the VM is connected.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, one manner in which to design a scalable data center fabric is to use what is commonly referred to as a "fat tree" or "spine-leaf" architecture. Such an architecture includes two types of switches, including a first type that that connects servers (referred to as "leaf" switches or nodes) and a second type that connects leaf switches/nodes (referred to as "spine" switches or nodes). Typically, via protocols like Cisco Discovery Protocol ("CDP") and Link Layer Discovery Protocol ("LLDP"), the ToR nodes are aware of their physical connectivity to other devices, including physical servers; however, which VMs exist below a given leaf switch at any given time is known only via protocols such as Address Resolution Protocol ("ARP"), Dynamic Host Configuration Protocol ("DHCP"), and Neighbor Discovery ("ND"), for example, based on network interface identifiers such as Internet Protocol ("IP") address, MAC address, etc. What has been missing is a scalable solution that allows this information to be tracked directly from a data center's orchestration engine all the way to the physical network switches comprising the data center fabric. It will be noted that the embodiments described herein, although described for the sake of example with reference to a fat tree architecture, may be implemented in network architectures that are not implemented as a fat tree.

Embodiments described herein provide a scalable mechanism for tracking VMs in a data center fabric. Certain embodiments employ VSI Discovery and Configuration Protocol ("VDP") to carry VM-based identifiers (such as the name of the VM and/or the Universal Unique Identifier ("UUID") associated with the VM) from a virtual switch to which the VM is connected to the physical switch at the edge of the data center fabric, where it is made available to the data center network manager ("DCNM") in response to a query. This allows the data center fabric to be queried for the current location of a particular VM in terms of the leaf and port to which it is currently connected.

It will be recognized that tracking end-hosts (typically VMs) in large data center deployments can be quite challenging, especially with hundreds to thousands of VMs to track. While the different orchestration engines that deploy the VMs may be aware of the physical servers on which the VMs reside, they do not have any visibility into the physical network infrastructure. From a data center troubleshooting and visibility point of view, it is extremely important to know which VMs reside behind which physical switches, or ToRs.

VDP is an IEEE 802.1Qbg standard that enables a virtual switch, or virtual station, to exchange information about its directly attached VMs with its adjacent bridge or switch (i.e., ToR or leaf switch). The information exchanged may include information regarding events like events like VM coming up, VM move, VM going down, etc. This allows the directly attached bridge or switch to provision network resources, such as VLAN, etc., for the VM so that is ready to handle subsequent traffic to and from the VM. It should be noted that VDP communicates on a per-vNIC basis. As a result, it shades the unique VM identity behind the vNIC. For example, in the case that a VM comes up with multiple vNICs or a VM adds/deletes multiple vNICs, the standard VDP views and presents each of these as separate events to the user.

Figure 1:
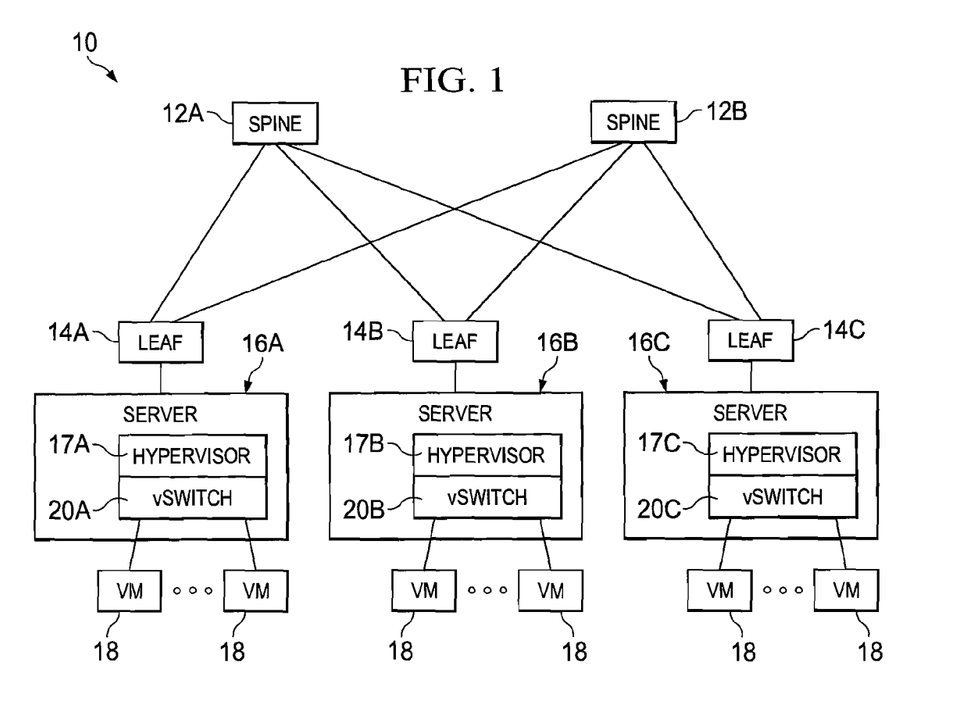
FIG. 1 is a simplified block diagram of an example data center network implemented using a fat-tree fabric topology in accordance with aspects of embodiments described herein.

FIG. 1 is a simplified block diagram of an example data center network implemented using a fat-tree fabric topology in accordance with aspects of embodiments described herein. In particular, FIG. 1 depicts an example data center network fabric implementation 10, which in one embodiment comprises a portion of a Massive Scalable Data Center ("MSDC") network. As shown in FIG. 1, the network 10 includes two spine switches, or spine nodes, 12A, 12B, and three leaf switches/nodes 14A-14C. Each of the leaf nodes 14A-14C is connected to each of the spine nodes 12A, 12B, respectively, in accordance with a two-tier fat tree topology. In the illustrated embodiment, servers, represented in FIG. 1 by servers 16A-16C, are connected to the leaf nodes 14A-14C. Each of the servers 16A-16C comprises a hypervisor 17A-17C, respectively, for managing a plurality of VMs 18 instantiated on the respective one of the servers 16A-16C. The VMs of each server 16A-16C are interconnected via a virtual switch ("vSwitch") 20A-20C. As will be recognized by those of ordinary skill in the art, different ones of VMs 18 may be associated with different tenants. For purposes of explanation, it will be assumed for the sake of example that each of the vSwitches 20A-20C is implemented using a Cisco Nexus 1000v ("N1Kv"), available from Cisco Systems of San Jose, Calif.; however, it will be understood that other types of virtual switches may be employed.

Most hypervisors employ a virtual switch ("vSwitch") to connect VMs to the external network (e.g., the network fabric). A vSwitch may also support connections between VMs on a single physical server. The IEEE 802.1Qbg standard referenced above has been responsible for creating an Edge Virtual Bridging ("EVB") industry group to address various aspects of EVB, including VSI Discovery. VSI is an internal point-to-point Ethernet LAN that connects a bridge port of a vSwitch to a vNIC. Each VSI carries a single MAC service instance. The term VSI may refer to the reference point at which the internal LAN attaches to the vNIC. VDP is used to discover and configure a VSI instance.

Figure 2:
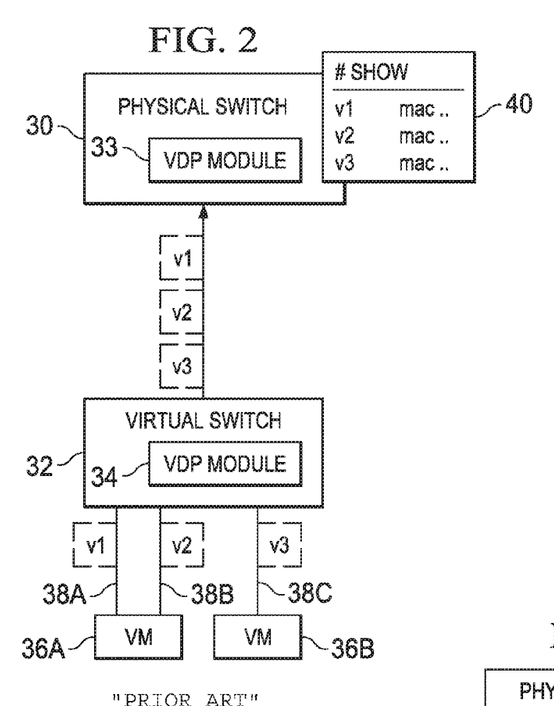
FIG. 2 is a simplified block diagram illustrating a standard VSI Discovery and Configuration Protocol ("VDP") exchange in portion of an example data center network.

FIG. 2 is a simplified block diagram illustrating a standard VDP exchange in portion of an example data center network. As shown in FIG. 2, a physical switch 30, which in one embodiment comprises a leaf, or TOR switch, is connected to a vSwitch 32, which in one embodiment may be implemented on a server, such one of as servers 16A-16C. As illustrated in FIG. 2, each of physical switch 30 and vSwitch 32 include a VDP module 33, 34, respectively, for implementing VDP to communicate information for associating and de-associating a VSI instance (corresponding to a vNIC) with a VSI Type Identifier ("VTID"), a VSI Type Version, a VSI Manager Identifier, and at least one a MAC address/VLAN ID pair.

Referring again to FIG. 2, two VMs 36A and 36B are connected to vSwitch 32. VM 36A has two vNICs, vNIC 38A and 38B, associated therewith. VM 36B has a single vNIC (vNIC 38C) associated therewith. In a standard VDP exchange between vSwitch 32 and physical switch 30 (via the modules 32, 34), all that is presented to the physical switch is information regarding the three individual vNICs 38A-38C, which is stored in a VDP table 40 in a memory device internal to or accessible by physical switch 30. No information regarding the VMs 36A, 36B, connected to the three vNICs 38A-38C is provided to the physical switch 30. This presents obvious difficulties on the fabric/network side when it comes to tracking back from a vNIC to the actual VM to which it is associated. Lack of VM identification information complicates network debugging and troubleshooting for obvious reasons.

In one embodiment, an extension mechanism provided in the aforementioned IEEE 802.1Qbg standard is utilized to make information regarding the VMs connected to the vNICs accessible to the physical switch and thereby to the entire network fabric. Once available, this information may be used in a variety of ways and for a range of purposes, including, but not limited to, debugging and troubleshooting.

Figure 3:
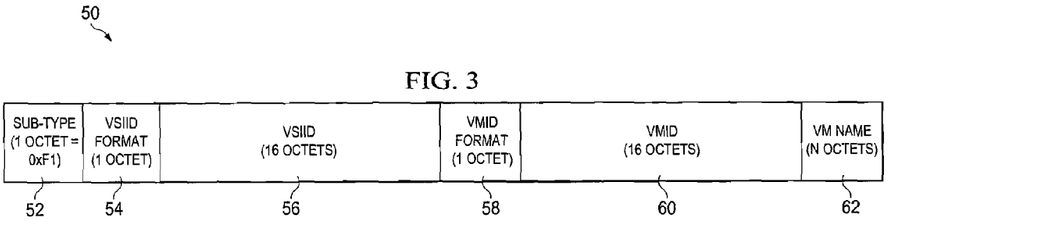
FIG. 3 illustrates a Virtual Station Interface ("VSI") Type-Length-Value ("TLV") element included in a packet for use in an augmented VDS exchange in accordance with aspects of embodiments described herein.

FIG. 3 illustrates a Virtual Station Interface ("VSI") Type-Length-Value ("TLV") element that may be included in a packet for use in an augmented VDS exchange in accordance with aspects of embodiments described herein. In particular, as shown in FIG. 3, an embodiment of a VM Identity TLV 50 includes a one octet sub-type field 52 for indicating that the TLV is a VM Identity TLV (a TLV used for the purpose of VM Identity), a one-octet VSIID Format field 54 for indicating a format used in the following field as the vNIC, or VSI, identifier (e.g., MAC address, IP address, or UUID), a 16 octet VSIID field 56 comprising a VSI identifier in a format indicated in the VSIID Format field 54, a one octet VMID format field 58 for indicating a format used in the following field as the VM Identifier ("VMID"), a 16 octet VMID field 60 comprising a VM identifier, and an N octet VM name field 62 comprising a name of the VM identified by the VM Identity TLV 50.

Figure 4:
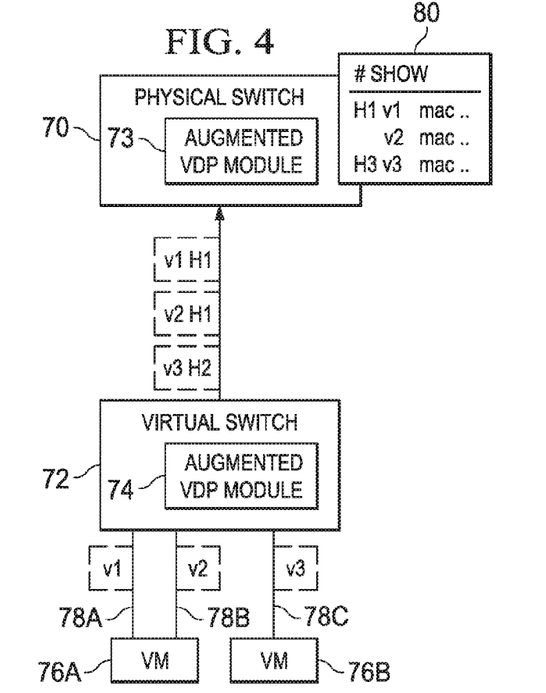
FIG. 4 is a simplified block diagram illustrating an augmented VDP exchange using a VSI TLV element such as illustrated in FIG. 3 in accordance with aspects of embodiments described herein.

FIG. 4 is a simplified block diagram illustrating an augmented VDP exchange using a VSI TLV element such as illustrated in FIG. 3 in accordance with aspects of embodiments described herein. As shown in FIG. 4, a physical switch 70, which in one embodiment comprises a leaf, or TOR switch, is connected to a vSwitch 72, which in one embodiment may be implemented on a server, such one of servers 16A-16C. As illustrated in FIG. 4, and as will be described in greater detail below, each of physical switch 70 and vSwitch 72 includes an augmented VDP module 73, 74, respectively, for implementing VDP to communicate information for associating and de-associating a VSI instance (corresponding to a vNIC) with a VSI Type Identifier ("VTID"), a VSI Type Version, a VSI Manager Identifier, at least one a MAC address/VLAN ID pair, and a VM (by name and/or UUID) in accordance with embodiments described herein using the augmented VSI TLV illustrated in FIG. 3.

Referring again to FIG. 4, two VMs 76A and 76B are connected to vSwitch 72. VM 36A has two vNICs, vNIC 78A and 78B, associated therewith. VM 76B has a single vNIC (vNIC 78C) associated therewith. In an augmented VDP exchange between vSwitch 72 and physical switch 70 (via the modules 73, 74), as described herein, the physical switch is presented with information regarding the three individual vNICs 78A-78C as well as their associated VMs 36A, 36B, which is stored in an augmented VDP table 80 in a memory device internal to or accessible by physical switch 70. In this manner, the identity of the VM attached to each VSI/vNIC is communicated to the physical switch 70.

The information can be presented in an organizationally unique format, such as hierarchically. When a switch involved in the network fabric receives its information, it makes the information available through any number of interfaces, including, for example, a Command Line Interface ("CLI"), an XML Application Programming Interface ("API"), or a REST-based interface, so that a network manager, such as Data Center Network Manager ("DCNM") can query the information and display it to the data center administrator via a simple user-friendly interface. As an example, in FIG. 4, the physical switch now receives a packet including the additional TLV indicating the VM identity. Based on this knowledge, the physical switch can present the VM identity (e.g., VM Name), as well as the hierarchical relationship between a VM and its vNICs. It is possible that the VM Name may not be unique across tenants, in which case, the VM name can be translated to a UUID and then search can be made on the latter. Alternatively, the VM name search can be performed in a more contextual manner by doing the search only within a specific/desired tenant-org. VDP on the leaf retains information about all the VMs, including the VRFs and/or tenants to which they belong, which information can be leveraged for use by other elements.

Figure 5:
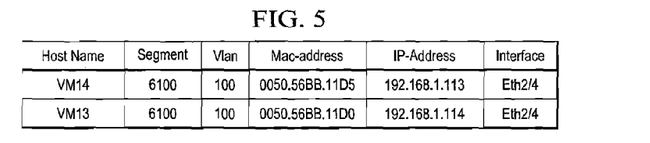
FIG. 5 illustrates an augmented VDP table that may be stored at the physical switch in accordance with aspects of embodiments described herein.

FIG. 5 illustrates an augmented VDP table 90 that may be stored at the physical switch in accordance with aspects of embodiments described herein. As shown in FIG. 5, the table 90 includes an entry for each of two end hosts, or VMs, identified by name (VM14 and VM13). The segment, VLAN, MAC address, IP address, and interface associated with each of the VMs are also indicated in the table 90.

Figure 6:
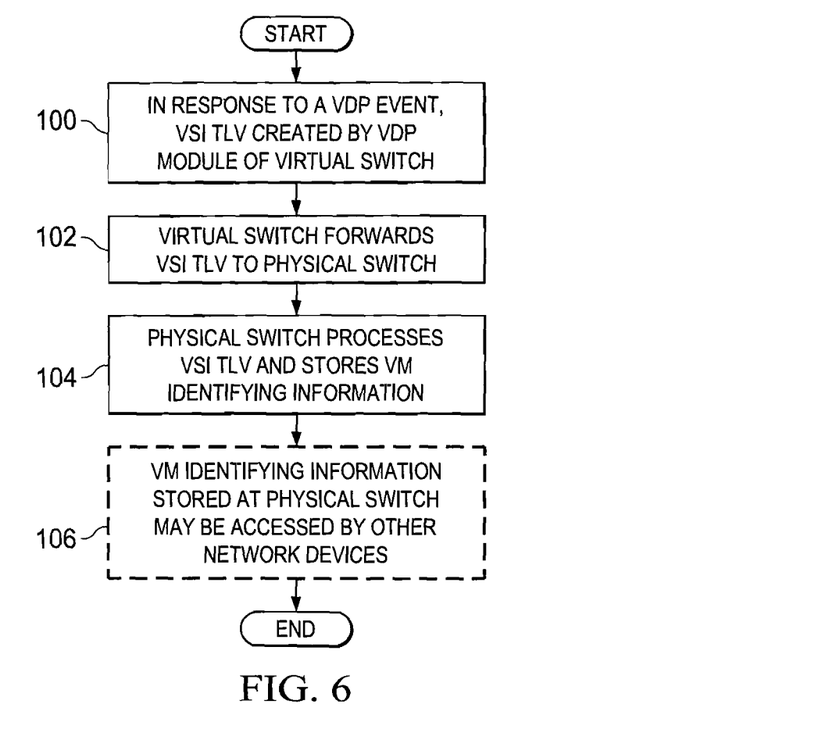
FIG. 6 is a flowchart illustrating a process for enabling scalable VM tracking in a data center in accordance with aspects of embodiments described herein.

FIG. 6 is a flowchart illustrating a process for enabling scalable VM tracking in a data center in accordance with aspects of embodiments described herein. Referring to FIG. 6, in step 100, responsive to occurrence of a VDP event, such as when a VM is provisioned or a vNIC is added to a VM, the vSwitch learns of the event and triggers a VDP exchange with the physical switch. In particular, a packet including a VSI TLV is created by the vSwitch side VDP module (e.g., module 74). In accordance with features of embodiments described herein, the VSI TLV includes a name of the VM with which the VSI is associated. In step 102, the packet including the TLV is forwarded to the physical switch side VDP. In step 104, the packet including the VSI TLV is processed on the physical switch side (e.g., by the module 72) and identifying information is stored at the physical switch, e.g., in a table stored in a memory device. As shown in FIG. 4, the information stored by the physical switch and accessible therefrom includes not only the identity of the vNIC and the MAC address associated therewith, but also the name of the VM with which each vNIC is associated. As show in optional step 106, the information stored on the physical switch can be accessed from the VDP table 80 by other network devices using a variety of interfaces.

In one example implementation, various devices involved in implementing the embodiments described herein can include software for achieving the described functions. For example, referring to FIG. 4, the physical switch 30 and the virtual switch 32 may each include an augmented VDP module 72, 74, comprising software embodied in one or more tangible media for facilitating the activities described herein. Each of the switches 30, 32, may also include or have associated therewith a memory device (or memory element) for storing information to be used in achieving the functions as outlined herein, including, for example, the VDP table 80. Additionally, the switches 30, 32, may each include a processor capable of executing software or an algorithm (such as embodied in modules 72, 74) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIG. 5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of multiple components. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving at a first network element a packet from a second network element;
    processing the packet at the first network element to obtain information regarding an identity of a virtual network interface card ("vNIC") hosted by the second network element contained within the packet; and
    storing at the first network element the identifying information, wherein the identifying information stored at the first network element is accessible by at least one third network element for use by the at least one third network element in troubleshooting and debugging a network;
    wherein the identifying information includes an identity of a virtual machine ("VM") connected to the second network element via the vNIC.

2. The method of claim 1, wherein the first network element comprises a physical switch.

3. The method of claim 1, wherein the second network element comprises a virtual switch.

4. The method of claim 1, wherein the packet is created by the second network element in response to a Virtual Station Interface Discovery and Configuration Protocol ("VDP") event.

5. The method of claim 1, wherein the at least one third network element comprises a physical switch.

6. The method of claim 1, wherein the first network element comprises a leaf switch and the at least one third network element comprises a spine switch connected to the leaf switch.

7. The method of claim 1, wherein the packet includes a Type-Length-Value ("TLV") element comprising the identifying information.

8. One or more non-transitory tangible media that includes code for execution and when executed by a processor is operable to perform operations comprising:
    receiving at a first network element a packet from a second network element;
    processing the packet at the first network element to obtain information regarding an identity of a virtual network interface card ("vNIC") hosted by the second network element contained within the packet; and
    storing at the first network element the identifying information, wherein the identifying information stored at the first network element is accessible by at least one third network element for use by the at least one third network element in troubleshooting and debugging a network;
    wherein the identifying information includes an identity of a virtual machine ("VM") connected to the second network element via the vNIC.

9. The media of claim 8, wherein the first network element comprises a physical switch.

10. The media of claim 8, wherein the second network element comprises a virtual switch.

11. The media of claim 8, wherein the packet is created by the second network element in response to a Virtual Station Interface Discovery and Configuration Protocol ("VDP") event.

12. The media of claim 8, wherein the first network element comprises a leaf switch and the at least one third network element comprises a spine switch connected to the leaf switch.

13. The media of claim 8, wherein the packet includes a Type-Length-Value ("TLV") element comprising the identifying information.

14. An apparatus comprising:
    memory element configured to store data;
    a processor operable to execute instructions associated with the data; and
    a Virtual Station Interface Discovery and Configuration Protocol ("VDP") module configured to:
        receive a packet from a second network element;
        process the packet at the first network element to obtain information regarding an identity of a virtual network interface card ("vNIC") hosted by the second network element contained within the packet; and
        store the identifying information, wherein the stored identifying information is accessible by at least one third network element for use by the at least one third network element in troubleshooting and debugging a network;

wherein the identifying information includes an identity of a a virtual machine ("VM") connected to the second network element via the vNIC.

15. The apparatus of claim 14, wherein the first network element comprises a physical switch and the second network element comprises a virtual switch.

16. The apparatus of claim 14, wherein the first network element comprises a leaf switch and the at least one third network element comprises a spine switch connected to the leaf switch.

17. The apparatus of claim 14, wherein the packet includes a Type-Length-Value ("TLV") element comprising the identifying information.

* * * * *